(12) United States Patent
Arnaudov et al.

(10) Patent No.: US 12,568,990 B2
(45) Date of Patent: Mar. 10, 2026

(54) PLANT-PROTEIN-BASED STRUCTURANTS

(71) Applicant: Conopco Inc., Englewood Cliffs, NJ (US)

(72) Inventors: Luben Nikolaev Arnaudov, Vlaardingen (NL); Hendrikus Theodorus Wilhelmus Maria van der Hijden, Vlaardingen (NL); Meliana Ko, Vlaardingen (NL); Robert Vreeker, Vlaardingen (NL)

(73) Assignee: Conopco Inc., Englewood Cliffs, NJ (US)

( * ) Notice: Subject to any disclaimer, the term of this patent is extended or adjusted under 35 U.S.C. 154(b) by 1377 days.

(21) Appl. No.: 16/955,842

(22) PCT Filed: Dec. 18, 2018

(86) PCT No.: PCT/EP2018/085516
§ 371 (c)(1),
(2) Date: Jun. 19, 2020

(87) PCT Pub. No.: WO2019/121696
PCT Pub. Date: Jun. 27, 2019

(65) Prior Publication Data
US 2021/0298324 A1    Sep. 30, 2021

(30) Foreign Application Priority Data

Dec. 22, 2017    (EP) .................................... 17209950

(51) Int. Cl.
| | |
|---|---|
| *A23J 3/14* | (2006.01) |
| *A23D 7/005* | (2006.01) |
| *A23D 7/04* | (2006.01) |
| *A23L 23/00* | (2016.01) |
| *A23L 29/00* | (2016.01) |
| *A23L 29/269* | (2016.01) |
| *A23P 30/40* | (2016.01) |

(52) U.S. Cl.
CPC .............. *A23J 3/14* (2013.01); *A23D 7/0053* (2013.01); *A23D 7/04* (2013.01); *A23L 23/00* (2016.08); *A23L 29/035* (2016.08); *A23L 29/27* (2016.08); *A23P 30/40* (2016.08); *A23V 2002/00* (2013.01)

(58) Field of Classification Search
CPC . A23J 3/14; A23D 7/0053; A23D 7/04; A23L 23/00; A23L 29/035; A23L 29/27; A23L 23/10; A23L 29/269; A23P 30/40; A23V 2002/00; A23V 2000/00

USPC ......................................................... 426/564
See application file for complete search history.

(56) References Cited

U.S. PATENT DOCUMENTS

| | | | |
|---|---|---|---|
| 2008/0213412 A1 | 9/2008 | Yamada | |
| 2009/0061048 A1* | 3/2009 | Kohane ................... | A61P 43/00 426/531 |
| 2016/0062567 A1 | 3/2016 | Yang et al. | |

FOREIGN PATENT DOCUMENTS

| | | | |
|---|---|---|---|
| JP | 60164462 | 2/1984 | |
| JP | 63283545 | 11/1988 | |
| WO | 2012084441 | 6/2012 | |
| WO | 2014001016 | 1/2014 | |
| WO | WO-2014110540 A1 * | 7/2014 | .......... A23C 19/055 |
| WO | WO2016062567 | 4/2016 | |
| WO | 2017186558 | 11/2017 | |

OTHER PUBLICATIONS

NPL Aryees et al. (Aryee—Thesis , submitted for the Degree of Master of Science, Dept Food and Bioproduct sciences University of Saskatchewan, Canada) [2012]. (Year: 2012).*
NPL Orentas et al. (in Canadian J Microbiology vol. 9, pp. 427-430, 1961). (Year: 1961).*
Google Scholar Aryee Thesis (Google Scholar Search Report retrieved the NPL Aryee et al. on Jun. 13, 2023 ). (Year: 2023).*
NPL particle size and surface area (Retrieved on Oct. 16, 2023). (Year: 2023).*
Yuan-Yuan Chang et al: "Effect of gums on the rheological characteristics and microstructure of acid-induced SPI-gum mixed gels", Carbohydrate Polymers, vol. 108, Aug. 1, 2014 (Aug. 1, 2014), pp. 183-191, XP055453753.
Database WPI, Week 198540, Thomson Scientific, London, GB; An 1985-247311, XP002778503.

* cited by examiner

*Primary Examiner* — Erik Kashnikow
*Assistant Examiner* — Bhaskar Mukhopadhyay
(74) *Attorney, Agent, or Firm* — Ipsilon USA—NLO

(57)    ABSTRACT

The present invention relates to a solid, particulate plant-protein-based structurant composition comprising, based on total dry matter, a) 50-95 wt. % plant derived protein, b) 5-10 wt. % xanthan gum, c) 1-30 wt. % glucono delta lactone-derived acidulant. The invention further relates to a food product comprising said structurant composition. The invention further relates to a method for the preparation of said structurant composition and to a process for preparing a food product using said structurant composition.

8 Claims, No Drawings

PLANT-PROTEIN-BASED STRUCTURANTS

FIELD OF THE INVENTION

The present invention relates a solid, particulate plant-protein-based structurant composition, and to a savoury concentrate comprising such a structurant, edible salt, savoury taste giving ingredients and optionally further ingredients. The invention further relates to a method for the preparation of said composition and to a process for preparing the food product. The invention further relates to the use of such a composition for structuring an oil phase.

BACKGROUND OF THE INVENTION

Protein particles may be used for oil structuring. In particular a dried foam of proteins (such as egg white) is suitable for dispersion in an oil phase, because in a foam, the amphiphilic proteins will orient themselves exposing their hydrophobic parts to the air.

It is desirable to use plant protein rather than e.g. egg white for many reasons, for example the increasing consumer desire for vegan/non-animal foodstuffs. Moreover, plant based proteins are cheaper and more sustainable alternatives to meat/diary based proteins. However, drying a foam of plant protein is more challenging than for egg proteins, as such plant protein foams tend to collapse before they have solidified sufficiently to become stable.

Additionally, in view of the environmental impact of palm plantations and the poor consumer acceptability of palm fat, it is desirable to find a plant-based replacement for the use of palm fat in food products, in particular savoury concentrates.

Savoury concentrates typically have a shelf-life of several months at ambient temperature. Savoury concentrates that comprise high levels of liquid oil, such as vegetable oil, tend to show oil exudation during storage over time. Oil exudation results in the formation of an oily layer within the product package. This renders the product unattractive and may even cause consumers to reject the product.

Oil exudation in savoury concentrates can be minimized by mixing liquid oil with a high melting fat component. Examples of such high melting fat components are hydrogenated vegetable oils (e.g. fully hydrogenated rapeseed oil) or high melting palm oil fractions (palm stearins). However, these high melting fat components, unlike the liquid oil, contain high levels of saturated fatty acids. Fats that contain high levels of saturated fatty acids are generally regarded as less healthy than liquid oils that contain high levels of unsaturated fatty acids.

In addition, if these savoury concentrates with high melting fats are transported or stored in non-climate controlled trucks/warehouses, the temperature within the truck or warehouse may easily rise far above the melting temperature of the high melting fats, which affects the stability of the savoury concentrates, e.g. undesired layers are formed in the savoury concentrate.

Therefore there is a clear consumer need to obtain a stable savoury concentrate for the preparation of e.g. sauces, which contains a high level of liquid oil, but does not suffer from oil exudation or undesired layer formation US2008213412 relates to providing safe and stable edible materials. Example 12 describes lyophilization of 0.2% starch water solution, from which cotton-shaped dehydrated edible fiber mass was obtained. EVO oil 1,200 g, crushed dry copula 600 g, powdered skim milk 110 g, salt 20 g, and vitamins C 10 g were mixed. Furthermore, these mixtures were mixed with above dehydrated edible fiber mass 60 g for the impregnation. Above edible material of the provided embodiment 12 has the appearance same as margarine, and both the taste and the eating sensation were the same as margarine. In addition, this edible material had the form of hardness solidity like the margarine at room temperature. In example 14 that a meringue was dried by lyophilization. Then a sponge-shaped porous solid was obtained. This was sunk into EVO oil and impregnated with the EVO oil in decreased pressure by a vacuum pump.

SUMMARY OF THE INVENTION

The inventors of the present invention have developed a solid, particulate plant-protein-based structurant that provides stable food products that contain a high level of liquid oil and have a pleasant texture, that enables the formulation scientist to more easily blend the structurant with other food ingredients to provide a range of water-in-oil emulsions.

The inventors have unexpectedly found that oil exudation in food products such savoury concentrates can be minimized effectively by introducing into the liquid oil component a plant-protein-based structurant, being a dried foam comprising plant-based protein, xanthan gum and gluconolactone-derived acidulent. It was found that this plant-protein-based structurant is capable of forming an oil-retaining matrix within the liquid oil component. Unlike high melting fat, the oil-structuring properties of the plant-protein-based structurant is not affected by a temperature increase.

The presence of the plant-protein-based structurant in the food product has no adverse impact on the taste, texture and mouthfeel of savoury products that are prepared from these concentrates.

Without wishing to be bound by theory, it is believed that a complex coacervate of the proteins and the gum is formed during, and/or immediately after, aeration/foaming of the plant derived protein in the presence of xanthan gum and glucanolactone acidulent, which complex coacervate is stable enough to withstand drying to provide a particulate, dried foam. The orientation of the proteins in the complex coacervate, is such that the hydrophilic surface of the protein is shielded from the oil environment by a hydrophobic protein surface exposed to the oil environment, meaning that the particulate plant-protein-based foam functions as an oil structurant.

Accordingly, there is provided a solid, particulate plant-protein-based structurant composition comprising, based on total dry matter:

a. 50-95 wt. % plant derived protein,
b. 5-10 wt. % xanthan gum,
C. 1-30 wt. % glucono delta lactone-derived acidulant:

The present invention further pertains to a method of preparing such a structurant. Accordingly, there is provided a Method for the preparation of a composition as defined herein, comprising the steps of:

a. Providing an aqueous mixture comprising the plant protein, xanthan gum and glucono delta lactone-derived acidulant,
b. foaming the aqueous mixture of step a),
C. drying the foamed mixture of step b), preferably at a temperature of between 30° C. and 100° C., until the required water content is obtained,
d. optionally performing a size reduction and selection step.

The inventors have found that that a brittle foam can be prepared from plant proteins, esp. plant albumins, in particular from pulse seeds such as soy and yellow lentil. Such a foam can readily be crushed, even in situ in an oil phase to provide structuring to the oil phase with good weight efficiency and good texture.

The present invention further relates to a savoury concentrate comprising such a structurant, a process of preparing the savoury concentrate. The present invention also relates to the use of such a structurant to stabilize an oil phase.

DETAILED DESCRIPTION OF THE INVENTION

The word 'comprising' as used herein is intended to mean 'including' but not necessarily 'consisting of' or 'composed of'. In other words, the listed steps or options need not be exhaustive.

Unless specified otherwise, numerical ranges expressed in the format 'from x to y' or 'x-y' are understood to include x and y. When for a specific feature multiple preferred ranges are described in the format 'from x to y' or 'x-y', it is understood that all ranges combining the different endpoints are also contemplated. For the purpose of the invention ambient temperature is defined as a temperature of about 20° C.

Unless indicated otherwise, weight percentages (wt. %) are based on the total weight of the concentrate.

The term "protein" as used herein refers to a polypeptide having at least 50 amino acid residues. Preferably, the protein has a molecular weight of more than 5 kDa, preferably more than 10 kDa, even more preferably more than 20 kD, most preferably at least 30 kDa. Preferably the protein has a molecular weight of less than 150 kDa, preferably less than 125 kD, even more preferably less than 100 kDa.

The term "plant-protein" as used herein refers to a polypeptide sourced from a plant, i.e. vegetable, herb, legume or pulse, which protein may be present as part of a plant extract, concentrate, flour or isolate. Preferably, the plant-protein is sourced from dehulled and milled leguminous seeds.

"The term "legume flour" as used herein refers to a ground, dehulled and defatted legume material. A legume flour typically comprises ca. 30-45 wt. % protein. Soybean meal is an example of a legume flour.

The term "legume concentrate" as used herein refers to a carbohydrate poor, legume flour. Typically, a legume concentrate is the product of an aqueous alcohol extraction of a legume flour, which extraction removes soluble carbohydrates. A legume concentrate comprises ca. 50-80 wt. % protein, based on total dry matter of the legume concentrate. A legume concentrate is typically a solid, particulate mixture of proteins derived from a milled protein source such as lentils or chickpeas.

The term "legume isolate" as used herein refers to a legume protein composition, that comprises at least 90 wt. % legume protein, based on total dry matter of the legume protein composition. Typically, a legume isolate is provided by a pH adjustment and pI precipitation of legume proteins from a legume concentrate.

The term "globular protein" as used herein refers to a polypeptide that is soluble in water and saline solutions.

The term "albumin" as used herein refers to a protein that is soluble in water. Typically, albumin have a molecular weight in the range of 55-85 kDa. Reference is made to the Osborne protein classification system (T. B. Osborn, The Vegetable Proteins, Monogrpahs in Biochemistry, London: Longmans, Green and Co, 1924).

The term "globulin" as used herein refers to a protein that is soluble in saline solutions.

The term "legumin" as used herein refers to proteins obtained from beans, peas, lentils, vetches, hemp (specifically edestin) and other leguminous seeds. It is a globulin and structurally similar to the 11S globulin family.

The term "glucono delta lactone-derived acidulant" as used herein refers to the hydrolysis of glucono delta lactone to gluconic acid, which gluconic acid acids as an in-situ acidulent. "glucono delta lactone" as used herein refers to (3R,4S,5S,6R)-3,4,5-trihydroxy-6-(hydroxymethyl)tetra-hydro-2H-pyran-2-one.

The terms 'fat' or 'oil' are used interchangeably, unless specified otherwise. The terms 'fat' and 'oil' as used herein refers to glycerides selected from triglycerides, diglycerides, monoglycerides, phosphoglycerides, free fatty acids and combinations thereof. Where applicable the prefix 'liquid' or 'solid' is added to indicate whether the fat or oil is liquid or solid at 20° C. "Hardstock" is an example of a solid fat. Hardstock typically has a solid fat content at 20° C. ($N_{20}$) of at least 30%.

Preferably, the plant-protein-based structurant is in particulate form. The particulate form is a direct result of the manufacturing method used to obtain the plant-protein-based structurant. The plant-protein-based structurant is obtained by drying a foam comprising plant-based-protein, xanthan gum and glucono delta lactone.

The plant-protein-based structurant may be ground before it is contacted with the oil phase. Alternatively, or even additionally, a size reduction step may also be carried out after the plant-protein-based structurant was dispersed (at a relatively course size) in at least part of the oil phase.

The inventors have found that the lower the bulk density of the dried foam particles, the better the dried foam particles are capable of stabilizing an oil phase.

The dried foam particles preferably have a bulk density that falls within the range of 5-100 g/l. More preferably, the dried foam particles have a bulk density that falls within the range of 10-75 g/l, most preferably a bulk density that falls within the range of 15-50 g/l.

Preferably, the plant-protein-based structurant composition comprises, based on total dry matter, 55-90 wt. % plant derived protein, preferably 60-85 wt. %, even more preferably 65-80 wt. %.

In a preferred embodiment, the plant derived protein is a legume protein preferably selected from the group consisting of albumin, globulin, legumin, vicilin and combinations thereof, more preferably wherein the legume protein is an albumin. It has been found that a particularly effective structurant is provided by a composition comprising albumin.

Preferably, the plant protein is a legume concentrate or isolate, said concentrate comprising at least 40% protein, preferably at least 45 wt. %, even more preferably at least 50 wt. %.

In another preferred embodiment, the plant-protein-based structurant composition comprises, based on total dry matter, 5-8 wt. %, xanthan gum. The inventors have found that 5-8 wt. % xanthan gum provides good structuring of oil phases. The ability of the plant-protein-based structurant to stabilize oil phases is believed to be due to the ionic properties of the xanthan gum polymer.

In a preferred embodiment, the xanthan gum has a pyruvate content, based on weight of xanthan gum, of between 1 and 15 wt. %, more preferably between 2 and 10 wt. % and most preferably between 3 and 8 wt. %. A particularly effective structuring ability is observed when xanthan gum with a pyruvate content of between 1 and 15 wt. % is used, more preferably between 2 and 10% and most preferably between 3 and 8 wt. %.

Preferably, plant-protein-based structurant composition comprises, based on total dry matter, 5-25 wt. % glucono delta lactone-derived acidulant. Without wishing to be bound by theory, it is postulated that the glucono delta lactone is slowly hydrolysed during aeration thus slowly releasing acid (gluconic acid). The slow release of acid is believed to stabilize lead to a stable complex coacervated that is stable on drying of the foam.

In a preferred embodiment, the ratio of plant protein to xanthan gum to GDL is 10:1:5 to 10:1:0.3.

Preferably, at most 30 wt. % of the plant-protein-based structurant particles pass a sieve with a mesh size of 125 μm. More preferably, at most 20 wt. % of the plant-protein-based structurant particles pass a sieve with a mesh size of 125 μm, even more preferably at most 10 wt. %. If too many of plant-protein-based structurant particles are too small, the structurant is likely not to be able to provide a stable oil continuous food product.

Food Product—Preferably a Savoury Concentrate

The oil continuous food product according to invention is preferably a savoury concentrate, preferably in the solid form or in the form of a paste. More preferably the savoury concentrate is in the form of a paste, i.e. a very thick viscous fluid.

The oil continuous food product preferably comprises, by weight of the concentrate, 33-75 wt. % of the oil phase, more preferably 36-70 wt. % of the oil phase and most preferably 40-65 wt. %, of the oil phase.

Preferably, the oil phase has a solid fat content at 20° C. ($N_{20}$) of 0-15% and a liquid oil content at 20° C. that equals 100%−$N_{20}$.

In a preferred embodiment, the oil phase in the oil continuous food product preferably has a solid fat content at 20° C. ($N_{20}$) of less than 10%, even more preferably a $N_{20}$ of less than 5% and most preferably a $N_{20}$ of 0%.

The oil phase in the food product preferably has a solid fat content at 35° C. ($N_{35}$) of less than 5%, more preferably a $N_{35}$ of less than 3% and most preferably a $N_{35}$ of 0%.

Preferably, the oil phase contains at least 30 wt. % of vegetable oil, more preferably at least 50 wt. % of vegetable oil, even more preferably 70 wt. % of vegetable oil and most preferably the oil phase contains at least 90 wt. % of vegetable oil. Examples of vegetable oils that may be employed include sunflower oil, soybean oil, rapeseed oil, cottonseed oil, maize oil, olive oil, palm oil, palm kernel oil, coconut oil, fractions of these oils and combinations thereof.

The oil phase of the present invention preferably does not comprise hydrogenated fat.

The solid fat content of the oil phase can suitably be determined using the method described in *Animal and vegetable fats and oils—Determination of solid fat content by pulsed NMR—Part 1: Direct method*—ISO 8292-1:2008.

The 'oil exudation' can suitably be quantified by means of the method as explained below in the examples. An amount of free oil of not more than 1 wt. %, preferably not more than 0.5 wt. %, by weight of the total savoury concentrate, is considered to be acceptable.

The water content of the oil continuous food product refers to the total water content, thus including the water that is present within the ingredients of the savoury concentrate.

The oil continuous food product preferably comprises, by weight of the food product, 5-25 wt. %, more preferably 8-20 wt. %, of the edible salt, selected from sodium chloride, potassium chloride and combinations thereof. Preferably the edible salt is sodium chloride.

The oil continuous food product preferably comprises, by weight of the food product, 5-40 wt. %, preferably 10-30 wt. %, of the savoury taste giving ingredients, selected from glutamate, 5'-ribonucleotides, sucrose, glucose, fructose, lactic acid, citric acid and combinations thereof.

Preferably, these savoury taste giving ingredients may be added as such or as part of a more complex ingredient like a yeast extract, meat extract, plant extract or a fish extract.

The oil continuous food product preferably comprises, by weight of the concentrate, up to 9 wt. % of water, more preferably up to 8 wt. % of water.

Preferably, the plant-protein-based structurant is dispersed in the oil phase in a concentration of 0.2 to 8 wt. %, more preferably 0.3-6 wt. %, most preferably 0.5-4 wt. %, by weight of the combined weight of the liquid oil and the plant-protein-based structurant.

The "wt. % of the plant-protein-based structurant, by weight of the combined weight of the liquid oil and the plant-protein-based structurant", as used herein, is calculated by dividing: [100×the weight of the plant-protein-based structurant] by: [weight of the liquid oil+weight of the plant-protein-based structurant].

Preferably, the oil phase is a structured oil phase due to the presence of the plant-protein-based structurant.

The inventors have found that the plant-protein-based structurant can take over the structuring function of the high melting fat component that is typically applied in such food products to prevent oil exudation. The high melting fat component and the plant-protein-based structurant can be used in combination to structure the liquid oil component of the oil continuous food product.

Typically, the sum of (i) the wt. % of the plant-protein-based structurant, by weight of the combined weight of the liquid oil and the plant-protein-based structurant, and (ii) the percentage of solid fat content in the oil phase at 20° C. ($N_{20}$), lies within the range of 1-20, more preferably this sum lies within the range of 1.5-17, even more preferably within the range of 2-15, yet even more preferably within the range of 2.5-13 and most preferably this sum lies within the range of 3-11.

Preferably, the components a) to e) of the oil continuous food product together constitute at least 60 wt. % of the food product. More preferably, the components a) to e) of the food product together constitute at least 65 wt. % of the food product. Most preferably, the components a) to e) of the food product together constitute at least 70 wt. % of the food product.

The ratio of dry matter by weight to the oil phase, by weight in the food product, lies within the range of 2:1 to 0.2:1. More preferably, said weight ratio in the food product lies within the range of 1:1 to 0.5:1.

The food product preferably has a water activity (Aw) within the range of 0.15-0.6, more preferably within the range of 0.2-0.55 and most preferably within the range of 0.25-0.50.

The food product preferably comprises, by weight of the food product, not more than 25 wt. % of sugars selected from sucrose, glucose, fructose and combinations thereof. More preferably, the food product comprises, by weight of the food product, not more than 20 wt. % of said sugars.

The food product preferably comprises, by weight of the concentrate, 0.1-50 wt. % of particulate plant material selected from herbs, spices, vegetables and combinations thereof. More preferably, the food product comprises, by weight of the food product 1-40 wt. % of said particulate plant material and most preferably 5-35 wt. % of said particulate plant material.

Preferably, the particulate plant material has a mass weighted average diameter in the range of 50 to 3,000 μm, more preferably in the range of 80 to 1,000 μm and most preferably in the range of 100 to 500 μm.

In a particularly preferred embodiment, the oil continuous food product is a savoury concentrate comprising, by weight of the food product:
- a) at least 30 wt. % of an oil phase comprising liquid oil,
- b) 1-10 wt. % particulate plant-protein-based structurant composition according to any of the embodiments,
- c) 0-30 wt. %, by weight of the food product, of an edible salt selected from sodium chloride, potassium chloride and combinations thereof,
- d) 1-50 wt. %, by weight of the food product, of savoury taste giving ingredients selected from glutamate, 5'-ribonucleotides, sucrose, glucose, fructose, lactic acid, citric acid and combinations thereof
- e) 0-10 wt. %, by weight of the food product, of water.

In a particularly preferred embodiment, the oil continuous food product is a savoury concentrate comprising:
- a) 40-65 wt. %, by weight of the concentrate, of the oil phase having a solid fat content at 20° C. ($N_{20}$) of 0-5% and a liquid oil content at 20° C. that equals 100%–$N_{20}$;
- b) a particulate plant-protein-based structurant, wherein the plant-protein-based structurant is dispersed in the oil phase in a concentration of 0.5 to 4 wt. %, by weight of the combined weight of the liquid oil and the plant-protein-based structurant,
- c) 8-20 wt. %, by weight of the savoury concentrate, of an edible salt selected from sodium chloride, potassium chloride and combinations thereof;
- d) 10-30 wt. %, by weight of the concentrate, of savoury taste giving ingredients selected from glutamate, 5'-ribonucleotides, sucrose, glucose, fructose, lactic acid, citric acid and combinations thereof;
- e) up to 8 wt. %, by weight of the concentrate, of water;
- f) 5-35 wt. % of particulate plant material selected from herbs, spices, vegetables and combinations thereof; and
wherein the sum of (i) the wt. % of the plant-protein-based structurant, by weight of the combined weight of the liquid oil and the plant-protein-based structurant, and (ii) the percentage of solid fat content in the oil phase at 20° C. ($N_{20}$), lies within the range of 3-11.

In other aspect there is provided an oil continuous food product as defined herein, obtainable by a method as defined herein.

Accordingly, there is provided an oil continuous food product, preferably a savoury concentrate, comprising, by weight of the food product:
- a) at least 30 wt. % of an oil phase comprising liquid oil,
- b) 1-10 wt. % particulate plant-protein-based structurant composition as defined herein,
- c) 0-30 wt. %, by weight of the food product, of an edible salt selected from sodium chloride, potassium chloride and combinations thereof,
- d) 1-50 wt. %, by weight of the food product, of savoury taste giving ingredients selected from glutamate, 5'-ribonucleotides, sucrose, glucose, fructose, lactic acid, citric acid and combinations thereof
- e) 0-10 wt. %, by weight of the food product, of water,
wherein the an oil continuous food product is obtainable by a method comprising the steps of: dispersing the plant-protein-based structurant into the oil phase to obtain a dispersion; and combining said dispersion with the remaining components of the food product, or combining the plant-protein-based structurant with the other components of the food product, except for the oil phase, to obtain a mixture; and combining the mixture with the oil phase.

a Method for the Preparation of a Particulate Plant Protein Based Structurant

In a second aspect, the present invention relates to a method for the preparation of a composition according to any of the preceding embodiments, comprising the steps of:
- a. Providing an aqueous mixture comprising the plant protein, xanthan gum and glucono delta lactone-derived acidulant,
- b. foaming the aqueous mixture of step a),
- c. drying the foamed mixture of step b), preferably at a temperature of between 30° C. and 100° C., until the required water content is obtained,
- d. optionally performing a size reduction and selection step.

The foaming step may be carried out using any suitable mixer known to the skilled person. Alternatively, the foaming step may be carried out by other known means of aeration (e.g. via gas infusion or pressure in combination with fast expansion extrusion).

The drying step may be carried out by freeze dying or oven drying. In a preferred embodiment, the drying step is carried out by oven drying. Typically, oven drying is carried out at a temperature of between 30° C. and 100° C. for 2 to 48 hours to produce a solid, particulate foam, in other words, a solid particulate plant based protein structurant.

As described previously, a size reduction step may be carried out using a suitable mill known in the art.

In another aspect, the present invention relates to a solid, plant-protein-based structurant composition as defined herein obtainable by the method as defined herein Accordingly, there is provided a solid, particulate plant-protein-based structurant composition comprising, based on total dry matter:
- a) 50-95 wt. % plant derived protein,
- b) 5-10 wt. % xanthan gum,
- c) 1-30 wt. % glucono delta lactone-derived acidulant,
Wherein the solid, particulate plant-protein-based structurant composition is obtainable by a method, comprising the steps of:
- a. providing an aqueous mixture comprising the plant protein, xanthan gum and glucono delta lactone-derived acidulant,
- b. foaming the aqueous mixture of step a.,
- c. drying the foamed mixture of step b., preferably at a temperature of between 30° C. and 100° C., until the required water content is obtained,
- d. optionally performing a size reduction and selection step.

a Method for the Preparation of a Savoury Concentrate

The embodiments that have been described herein before in the context of the savoury concentrate of the invention equally apply to this method, according to the invention, for the preparation of a savoury concentrate.

Preferably, 0.2-8 parts by weight of the plant-protein-based structurant is combined with 100 parts by weight of oil phase. More preferably, 0.3-6 parts by weight of the plant-protein-based structurant is combined with 100 parts by weight of oil phase. Most preferably, 0.5-4 parts by weight of the plant-protein-based structurant is combined with 100 parts by weight of oil phase.

Preferably, 100 parts by weight of the oil phase are combined with 6-85 parts by weight of the edible salt. More preferably, 100 parts by weight of the oil phase are combined with 10-65 parts by weight of the edible salt.

Preferably, 100 parts by weight of the oil phase are combined with 6-130 parts by weight of the savoury taste giving ingredients. More preferably, 100 parts by weight of the oil phase are combined with 12-100 parts by weight of the savoury taste giving ingredients.

The prepared food product preferably comprises 33-75 wt. %, by weight of the concentrate, oil phase. More preferably, the prepared food product comprises 36-70 wt. %, by weight of the concentrate, of the oil phase. Most preferably, the prepared food product comprises 40-65 wt. %, by weight of the concentrate, of the oil phase.

Preferably, the oil phase has a solid fat content at 20° C. ($N_{20}$) of 0-15% and a liquid oil content at 20° C. that equals 100%-$N_{20}$.

In a preferred embodiment, the oil phase is prepared by blending two or more different oils or oil fractions to obtain the oil phase. For example, a melted high melting fat component can be mixed with a liquid oil to obtain an oil phase.

The prepared food product preferably comprises up to 9 wt. %, by weight of the food product, of water. More preferably, the prepared food product comprises up to 8 wt. %, by weight of the food product, of water.

In a preferred embodiment 100 parts by weight of the oil phase are combined with 0.1-165 parts by weight of particulate plant material selected from herbs, spices, vegetables and combinations thereof. More preferably, 100 parts by weight of the oil phase are combined with 1-135 parts by weight of said particulate plant material. Most preferably, 100 parts by weight of the oil phase are combined with 6-115 parts by weight of said particulate plant material.

In a preferred embodiment, the method comprises the steps of:

dispersing the plant-protein-based structurant into the oil phase to obtain a dispersion; and combining said dispersion with the remaining components of the food product.

In another preferred embodiment, the method comprises the steps of:

combining the plant-protein-based structurant with the other components of the food product, except for the oil phase, to obtain a mixture; and combining the mixture with the oil phase.

In a preferred embodiment, the method for the preparation of a savoury concentrate, comprises combining of the following components:

100 parts by weight of an oil phase comprising liquid oil;

0.2-8 parts by weight of a solid, particulate plant-protein-based structurant composition comprising, based on total dry matter:

a. 50-95 wt. % plant derived protein, b. 5-10 wt. % xanthan gum, c. 1-30 wt. % glucono delta lactone-derived acidulant, 4-45 parts by weight of an edible salt selected from sodium chloride, potassium chloride and combinations thereof;

1-120 parts by weight of savoury taste giving ingredients selected from glutamate, 5'-ribonucleotides, sucrose, glucose, fructose, lactic acid, citric acid and combinations thereof; and wherein the prepared savoury concentrate comprises not more than 10 wt. % water.

Preferably, the method of the invention produces the food product according to the invention as described herein before.

The savoury concentrate that is produced by the present method is preferably filled into a container (e.g. a jar), a pouch or a sachet.

In another aspect, the present invention relates to a cosmetic product comprising 1 to 10 wt. % of a particular, plant-protein-based structurant as defined herein.

Examples

General Procedures for Preparation of Solid, Particulate Structurant Composition 1. Preparation of Foam Mix (Mixing):

Protein/hydrocolloid solution was prepared by dispersing the powders into demineralized water and mixing it in an IKA stirrer, 400 RPM, 2 hours at ambient temperature, unless stated otherwise. Unless stated otherwise 400 grams of the mixture was put in a Kenwood Cooking Chef mixer fitted with a whipper accessory. In the case of GDL addition, the GDL powder was spread over this solution and slowly mixed (position 3) for 1 minute.

2. Foaming (Aeration)

Immediately after preparation the foaming solution was aerated by mixing at maximum speed in the Kenwood mixer for 10 minutes. The resulting foam was spread, in a 2 cm thick foam layer, on a baking plate covered with baking-paper.

3. Drying:

Oven Drying 30 minutes from the start of the foaming step, the foam was heated at 80° C. in a Siemens Kitchen oven (top-bottom heating) for 24 hours. Dry foam was chopped using a Brevill chopper in batches of 5 grams for 9 seconds.

Freeze Drying

The foam was spread in aluminium or plastic trays, to form about a 2 cm layer. Subsequently, the trays were covered and put in a freezer at −80° C. for 24 h. After the freezing step the trays were uncovered and put in an already precooled to −80° C. freeze-drier, Labconco Freezone 6+ and stored until required.

Dry Foam Particle Sizing

The resulting particles are sieved through Retsch sieves, which separates the particles into fractions <125 μm; 125-500 μm; 500-710 μm; 710-1000 μm; 1000-2000 μm and >2000 μm.

Characterization Methods

Moisture Content

Moisture content is calculated from the weight loss measured after heating samples to 100° C. for 16 hours (in vacuum).

Determination of Particle Size (Plant-Protein-Based Structurant)

The particle size distributions of the plant-protein-based structurants were analysed by a dry sieving method. A sample of dry plant-protein-based structurant was passed through a set of 5 steal sieves (ex Retsch, Germany), with a mesh size of 710 μm, 500 μm, 355 μm, 200 μm and 125 μm, respectively, starting with the sieve of the largest mesh size.

Bulk Density Determination:

The bulk density of the dried foam particles is measured by placing a metered glass cylinder (Hirshmann, techcolor, Germany 250 ml) on a balance with a funnel on top. The cylinder was filled (close to the funnel), the particle weight and volume were recorded, and the bulk density was calculated in g/L.

Foam Overrun & Stability

Foam was prepared from the solutions of Table 1 and the foamability determined as follows.

Overrun (OR) is defined as:

$$OR(\%) = \frac{V_1 - V_i}{V_1} \times 100\%$$ Equation 1

In which Vt=Volume after aeration; Vl=Volume liquid before aeration $$OR = (\rho_i/\rho_t - 1) \times 100\%$$ Equation 2

In which $\rho_i$=density liquid=mass liquid/volume liquid=1.04 g/ml, $\rho_t$=density foam=mass foam/volume foam A container with known volume (=volume foam) is filled using a 'decapped' 50 ml syringe with the foam produced in step 2 (scheme 1). Aeration and weighed (=mass foam). The OR is calculated according to Equation 2.

Foam stability is determined as ratio of the overrun after 24 hours storage at ambient temperature, divided by the overrun of the freshly prepared foam. Foams with a ratio of at least 0.9 are classified as stable.

Oil Exudation Assessment

The savoury concentrates were assessed for exudation of oil after 7 days of storage at ambient temperature. The lid of the savoury concentrate was removed and the savoury concentrate was subsequently turned at an angle between 135 and 180 degrees, where 180 degrees means completely upside down, for a time period of 1 minute. The oil that ran freely from the savoury concentrate was filtered using a tea sieve, and collected on a weighing plate. The amount of free oil was determined as weight percentage of the weight of the total savoury concentrate, i.e. the weight of the savoury concentrate before the weight of the free oil had been determined.

High Temperature Stability Test

To simulate tropical transit temperature conditions, the samples were placed overnight in an oven at 60° C. The next day, after letting the samples cool down to ambient temperature, the samples were inspected visually for undesired layer formation. In case a layer of free oil was formed, the weight percentage of this layer was determined according to the method described above.

Oil Structuring:

0.5 grams of dried foam was weighed into a plastic 50 ml container (dimensions). 9.5 g SFO (sunflower oil) was added on top of this foam and mixed manually with a stainless-steel spatula. The foam is defined as having adequate oil structuring properties, if the mixed sample stays at the bottom during one minute after turning the container upside down:

TABLE 1

| | Compositions tested | | |
|---|---|---|---|
| | Ingredients | | |
| Sam-ple | Protein source, based on total weight of protein source + hydrocolloid + water (wt. %) | Hydrocolloid, based on total weight of protein source + hydrocolloid + water (wt. %) | GDL, based on total of weight of protein source + hydrocolloid + water + GDL (wt. %) |
| 1 | YLP 5% | XG 0.5% | 0.18-1.3% |
| 2 | YLP 5% | XG high pyr. 0.5% | 1.3% |

TABLE 1-continued

| | Compositions tested | | |
|---|---|---|---|
| | Ingredients | | |
| Sam-ple | Protein source, based on total weight of protein source + hydrocolloid + water (wt. %) | Hydrocolloid, based on total weight of protein source + hydrocolloid + water (wt. %) | GDL, based on total of weight of protein source + hydrocolloid + water + GDL (wt. %) |
| 3 | SFL 5% | XG 0.5% | 0.17-1.45% |
| 4 | SPI 5% | XG 0.5% | 1.84% |
| 5 | YLP 5% | XG 0.7% | 1.3% |
| 6 | YLP 5% | XG 0.5% | 1.3% |
| A | YLP 5% | XG 0.5% | 0 |
| B | YLP 5% | XG low pyr. 0.5% | 1.3% |
| C | YLP 5%[1] | XG 0.5% | 1.3% |
| D | YLP 5% | Pectin (DE = 37%) 2% | 1.3% |
| E | YLP 5% | Iota Carrageenan 0.8% | 1.3% |
| F | YLP 5% | CMC 0.7% | 1.3% |
| G | YLP 5% | LA Gellan 0.4% | 1.3% |
| H | 0 | HPMC | 0 |

[1]particle size <125 um
YLP: yellow lentil protein concentrate (Vitessence); 52 wt. % protein.
SFL: soybean flour type I (Sigma Aldrich).
SPI: soy protein isolate (Myprotein); 90 wt. % protein.
XG: xanthan gum (Advanced performance, CP Kelco).
XG high pyr: xanthan gum high pyruvate (Grindsted Xanathan Gum MAS-SH; 5-6 wt. % pyruvate) Danisco.
XG low pyr.: Low pyruvate XG: GRINDSTED Xanthan Gum DAI-SH (Typically 1.5-2.5% pyruvate), Danisco.
Pectin: Pectin LC810 (Degree esterification 37%, Grinsted).
Iota-Carrageenan commercial grade Type II, Sigma.
CMC: Carboxymethylcellulose sodium salt, product number 21902, (Sigma Aldrich).
LA Gellan: low acyl food grade gellan gum, Kelcogel F (CPKelco).
HMPC: hydroxypropylmethylcellulose, Tylopur grade NE-4000 (Shin-Etsu Chemical Co. Ltd).

TABLE 2

| | Foam tests | | |
|---|---|---|---|
| I.D | Foamability/ overrun | Foam stability | Foam drying |
| 1 | 550-780 | Y | Oven dried |
| 2 | 720 | Y | Oven dried |
| 3 | 780-870 | Y | Oven dried |
| 4 | 950 | Y | Oven dried |
| 5 | 770-780 | Y | Oven dried |
| 6 | 676 | Y | Freeze dried |
| A | 620 | Y | Oven dried |
| B | 670 | N | Oven dried |
| C | 780 | Y | Oven dried |
| D | 230 | N | Oven dried |
| E | 420 | Y | Oven dried |
| F | 690 | Y | Oven dried |
| G | 620 | N | Oven dried |
| H | 250 | Y | Oven dried |

TABLE 3

| | Oil structuring test | |
|---|---|---|
| Sample | Oil Structuring | Texture |
| 1 | Y | Good |
| 2 | Y | Good |
| 3 | Y | Good |
| 4 | Y | Good |
| 5 | Y | Good |
| 6 | Y | Good |
| A | N | N/A |
| B | N | N/A |

TABLE 3-continued

| | Oil structuring test | |
| --- | --- | --- |
| Sample | Oil Structuring | Texture |
| C | N | N/A |
| D | N | N/A |
| E | N | N/A |
| F | N | N/A |
| G | N | N/A |
| H | Y | Poor |

Protein Tests

4×380 grams of 10 wt. % yellow lentil protein (YLP) in deionized water was separated into Supernatant (SN) and Sediment (SED) by centrifugation, conditions: 10000 RPM (17700 g) with a Beckman Centrifuge, rotor JA-10, T=20° C., 30 min. The protein content of SN and SED was determined with the Dumas method according to NEN-EN-ISO 16634-1:2008.

YLP contains 52.8 wt. % protein. A 10 wt. % YLP solution in distilled water contains 5.28 wt. % protein, of which 4.2 wt. % protein is extracted in SN, noted as 4.2 wt. % protein SN. The remaining protein in the SED is noted as 1.1% protein SED. Protein extracted in SN is defined as albumin. Protein in SED is defined as globulin.

Aqueous solutions were prepared from a SN fraction with protein contents 0.8-4.2 wt. % protein SN. Additionally, a solution was prepared from 5 wt. % YLP, which contains 2.1 wt. % protein SN and 0.5 wt. % protein SED.

Foamablity tests showed that a solution of 5 wt. % YLP, which contains 2.1 wt. % prot SN and 0.5 wt. % protein SED had a foamability of 408 whereas a solution of 5 wt. % YLP, which contains 4.2% SL had a foamability of 661%.

Bulk Density

Relationship between bulk density and weight percentage of structurant:

The amount of structurant (wt. %) that is required for a given savoury concentrate is directly proportional to the bulk density of the structurant as defined by Equation 3:

$$y = 0.2099x - 0.1539 \qquad \text{Equation 3}$$

wherein y is the weight percentage of structurant composition, and; x is the bulk density (g/L), on the proviso that $1 \leq y \leq 100$.

The savoury concentrates were prepared using the following procedure:

Oil Phase Preparation

The oil phase was prepared as follows:

A container was filled with oil at a temperature of 5° C.

A Silverson mixing head (type L4RT; fitted with 1 mm hole emulsion screen mixing head) was placed in the oil. The Silverson mixer was started operating at 3000 rpm.

Palm oil stearin (mfPOS (IV=14)) was heated to over 80° C. When the heated palm oil stearin was cooled down to 65° C., it was slowly poured into the oil, close to the mixing head to optimize the mixing of the palm oil stearin with the oil. Subsequently, the mixer speed was gradually increased to 7000 rpm.

After complete addition of the molten palm oil stearin, the mixture was sheared for an additional 2 minutes at a speed of 7000 rpm.

The resulting oil phase was stored overnight a 5° C. and used the next day.

Savoury Concentrate Preparation

The savoury concentrates were prepared as follows:

If applicable, the protein structurant was mixed with the oil phase manually, using a spoon.

All the dry ingredients were weighed and then mixed together for about 1 minute at speed 1, until homogeneous, in a Kenwood (type Chef classic or Chef premiere) kitchen machine, using the K-beater mixing tool.

The oil phase, including the protein structurant if applicable, was added to the dry ingredients mixture and mixed for 2 minutes applying the K-beater mixing tool at speed 2 until homogeneous.

About 80 grams of the final savoury concentrate was filled and capped in plastic (PP) jars with the following dimensions:

bottom diameter: 4.9 cm top diameter: 5.2 cm height of the container: 6.3 cm

The savoury concentrates were stored at ambient temperature.

TABLE 4

| | Savoury concentrates tested | | |
| --- | --- | --- | --- |
| Ingredient | Comparative example I | Comparative example II | Sample 7 |
| Sunflower oil | 45.7 | 34.7 | 43.0 |
| mfPOS(IV = 14) | 3 | 11.6 | 2.1 |
| Protein structurant (soy foam) | 0 | 0 | 2.9 |
| NaCl | 4.3 | 4.3 | 4.2 |
| KCl | 5.7 | 5.7 | 5.5 |
| Sugar | 15.7 | 15.7 | 15.2 |
| Powder mix[1] | 24.8 | 24.8 | 24.0 |
| Red bell pepper pieces | 2.8 | 2.8 | 2.7 |
| Basil | 0.2 | 0.2 | 0.2 |
| Parsley | 0.2 | 0.2 | 0.2 |
| Total | 100.0 | 100.0 | 100.0 |

[1]Dry mix of spices and yeast extract

The savoury concentrates so obtained were subjected to the high temperature stability test described above. The results are shown in Table 5.

TABLE 5

| | Analysis of savoury concentrates | | |
| --- | --- | --- | --- |
| Test | Comparative sample I | Comparative sample II | Sample 7 |
| Oil exudation at high temperature | Yes | Yes | NO |
| Layer formation upon storage | Yes | Yes | NO |

The results indicate that inclusion of plant derived protein structurant provides a stable product that does not show layer formation or oil exudation after exposure to high temperatures, e.g. during transport.

The invention claimed is:

1. A solid, particulate plant-protein-based structurant composition comprising, based on total dry matter:
   a) 50-95 wt. % plant derived protein,
   b) 5-10 wt. % xanthan gum, wherein the xanthan gum has a pyruvate content, based on weight of xanthan gum, of between 3 and 8 wt. %,
   c) 1-30 wt. % glucono delta lactone-derived acidulant,
   wherein at most 30 wt. % of the plant-protein-based structurant particles pass a sieve with a mesh size of 125 μm, and
   wherein the solid particulate plant-protein-based structurant composition is a complex coacervate.

2. The composition according to claim 1, wherein the composition comprises, based on total dry matter, 55-90 wt. % plant derived protein %.

3. The composition according to claim 1, wherein the plant derived protein is a legume protein selected from the group consisting of albumin, globulin, legumin, vicilin and combinations thereof.

4. The composition according to claim 1, wherein the plant derived protein is a legume concentrate or a legume isolate, wherein the legume concentrate or the legume isolate comprise at least 40% protein content.

5. The composition according to claim 1, wherein the composition comprises, based on total dry matter, 5-8 wt. %, xanthan gum.

6. The composition according to claim 1, wherein the composition comprises, based on total dry matter, 5-25 wt. % glucono delta lactone-derived acidulant.

7. The composition according to claim 1, wherein the ratio of plant derived protein to xanthan gum to glucono delta lactone-derived acidulant (GDL) is 10:1:5 to 10:1:0.3.

8. An oil continuous food product comprising, by weight of the food product:
   a) at least 30 wt. % of an oil phase comprising liquid oil,
   b) 1-10 wt. % particulate plant-protein-based structurant composition according to claim 1,
   c) 0-30 wt. %, by weight of the food product, of an edible salt selected from sodium chloride, potassium chloride and combinations thereof,
   d) 1-50 wt. %, by weight of the food product, of savoury taste giving ingredients selected from glutamate, 5'-ribonucleotides, sucrose, glucose, fructose, lactic acid, citric acid and combinations thereof,
   e) 0-10 wt. %, by weight of the food product, of water.

* * * * *